United States Patent

[11] 3,593,126

| [72] | Inventor | Howard V. May<br>Winston-Salem, N.C. |
|---|---|---|
| [21] | Appl. No. | 825,266 |
| [22] | Filed | May 16, 1969 |
| [45] | Patented | July 13, 1971 |
| [73] | Assignee | Western Electric Company Incorporated<br>New York, N.Y. |

[54] AUTOMATIC SELF-BALANCING OPERATIONAL AMPLIFIER IMPEDANCE BRIDGE
6 Claims, 5 Drawing Figs.

| [52] | U.S. Cl. | 324/57 R |
|---|---|---|
| [51] | Int. Cl. | G01n 27/00 |
| [50] | Field of Search | 324/57 B,<br>57 Z, 59, 60 |

[56] References Cited
UNITED STATES PATENTS

| 3,034,044 | 5/1962 | Konigsberg | 324/57 |
|---|---|---|---|
| 3,209,908 | 10/1965 | Hopkins | 324/57 X |
| 3,445,763 | 5/1969 | Harris, Jr. | 324/57 |

*Primary Examiner*—Edward E. Kubasiewicz
*Attorneys*—H. J. Winegar, R. P. Miller and S. Gundersen ABSTRACT: An automatic self-balancing bridge measures the parameters of series L-R or C-R impedances. The bridge proper utilizes operational amplifiers to provide current conversion in one of its product arms and integration and current inversion in its standard arm. The bridge standards may be banks of three terminal capacitors or resistors, which are switched in automatically by relays through a logic-controlled balancing system. The automatic balancing system is based on the phase characteristics of the bridge circuit and includes two phase-sensitive detectors, one for one parameter of the bridge which may be inductance or capacitance and one for resistance. The phase-sensitive detectors control the counting directions of two banks of up-down decade counters, the outputs of which drive the relays and two digital display indicators for the parameters to be measured. The bridge standards may be operated at a fixed frequency independent of the test frequency by providing the apparatus with a heterodyning means.

Fig-2

AUTOMATIC SELF-BALANCING OPERATIONAL AMPLIFIER IMPEDANCE BRIDGE

BACKGROUND OF THE INVENTION

1. Field of the Invention

The invention is concerned with automatic impedance-measuring apparatus and in particular to an automatic self-balancing AC impedance bridge-type device in which the values of two adjustable balancing standards, one for a reactance parameter and one for a resistance parameter, may be adjusted to balance the bridge in response to the output of two phase-sensitive detectors, one for resistance and one for reactance.

2. Technical Considerations and Prior Art

Many prior art impedance bridges having automatically adjustable balancing standards utilize analog techniques requiring servomotors connected to the adjustable elements on the standards. The precision with which the values of the standards are varied is dependent upon the accuracy with which the servomotors can be controlled as well as the accuracy of the standards.

In many known impedance bridges for measuring the series parameters of an unknown impedance in which a phase-sensitive detecting scheme is utilized, the excitation voltage applied to the bridge is frequently used as a phase-detector reference voltage. This requires a phase adjustment whenever the impedance of the unknown has changed significantly. This type of reference voltage is not suitable for an automatic bridge wherein it is desired to obtain a rapid balance for any value of impedance within the test range of the bridge.

Known series impedance-measuring bridges also have an internal impedance which varies as the values of the bridge-balancing standards are varied. This causes a variation in the signal level applied to the unknown, an undesirable side effect where it is desired to test many components at a specified voltage level.

Furthermore, known bridges which use a capacitance standard for the series reactance parameter of an impedance do not have a low impedance looking into the test terminals, i.e., the Thevenin equivalent of the bridge circuit is not very low in comparison to the impedance of the unknown. Therefore, for a fixed voltage applied to the bridge the voltage across the unknown is a function of the impedance thereof.

Still furthermore, many known series impedance-measuring bridges use two terminal-balancing standards. Three-terminal standards, however, are capable of much greater precision in switching applications than are two-terminal standards.

It would be an advantage to construct and utilize an AC bridge, capable of measuring the series parameters of the resistance and reactance of an impedance automatically with a specified voltage applied to the terminals of the unknown in which: (1) a properly phased reference voltage for use with a phase-sensitive detection scheme is available from within the bridge itself; (2) the applied voltage is independent of the balancing operation; (3) the bridge circuit has an internal impedance which is very low so that the source voltage is essentially equal to the voltage across the unknown; and (4) three-terminal standards are utilized to provide greater accuracy in measurement than can be attained with two terminal standards.

SUMMARY OF THE INVENTION

It is an object of the present invention to provide a new and improved automatic self-balancing impedance bridge having adjustable balancing standards made up of weighted electrical components which are permutatively switched to vary their overall value in response to unbalance information derived from the bridge.

Another object of the present invention is to provide a new and improved automatic self-balancing impedance bridge in which the balancing information is digital information which simultaneously (1) adjusts the values of the bridge-balancing standards to balance the bridge and (2) drives a pair of digital display indicators to provide a direct visual readout of the values of the parameters of the unknown impedance.

A further object of the present invention is to provide a new and improved AC impedance bridge, for measuring the series parameters of an impedance, which, when operated, provides from within itself an accessible reference voltage which always has the proper phase for use with a phase-sensitive detector.

An additional object of the present invention is to provide a new and improved AC impedance bridge for measuring the series parameters of an impedance in which the applied voltage is independent of the balancing operation, the internal impedance is low, and the bridge standards are three-terminal capacitors.

With these and other objects in view one embodiment of the present invention contemplates an automatic self-balancing AC impedance-measuring apparatus for measuring the series inductance and effective resistance of an inductor.

The bridge circuit proper has four conductive arms. The first arm contains a pair of test terminals to which the inductor under test is connected. The second arm contains a fixed resistance and is connected to the first arm. The third arm is connected to the second arm and contains two variable balancing standards, one for balancing out the inductance parameter of an inductor under test and the other for balancing out the resistance parameter of the inductor under test. The fourth bridge arm is connected between the first arm and the third arm and contains a current-to-voltage converter for receiving and converting the current through the unknown impedance into an equivalent voltage.

The junction between the first and second arms is the point of connection of a source of alternating current for operating the bridge. The junction point between the second and third arms is connected to the input of a first operational amplifier which provides an output voltage indicative of the current summed at its input, the impedance looking into which is near zero to prevent a sliding balance. A balancing apparatus is connected to the output of this operational amplifier for varying the values of the balancing standards to balance out the elemental parameters of the unknown when this operational amplifier output is other than zero.

The current-to-voltage converter in the fourth arm of the bridge is a second operational amplifier having a fixed-valued feedback resistor. The output of the current-to-voltage converter is used as a reference voltage for a phase-sensitive detector.

The variable balancing standards are weighted capacitors or a combination of capacitors and resistors which are permutatively switched to vary their overall value.

The reference voltage and the signal voltage at the output of the first operational amplifier are connected to two phase detectors, one for the inductance and one for the resistance of the inductor under test. The outputs of the phase detectors are gated to two bands of decade counters under the control of a shift register having one stage for each power of 10 associated with the value of inductance and resistance. The decade counters have binary-coded-decimal outputs which are used to operate relays to switch in the various discrete standard components. The binary-coded-decimal outputs of each bank of decade counters also drive a pair of digital indicators to display directly the values of the inductance and the resistance of the inductor under test.

In accordance with another embodiment of the invention, the bridge-balancing standards are operated at a frequency independent of the frequency of the test current through the unknown, by incorporating an arrangement utilizing a second signal source operated at a fixed frequency difference from the first signal source. Two modulators are connected in the first and second arms of the bridge to provide a heterodyning arrangement which delivers an intermediate frequency operating signal to the bridge-balancing standards. In this way, the high frequency parameters of an unknown impedance can be measured without recalibrating the standards, since the standards are always operated at a single frequency.

In accordance with a further embodiment of the invention, the bridge circuit of the invention may be modified to measure the series capacitance and resistance of a capacitor by changing the location of one of the standards making it a feedback element of an operational amplifier within the standard arm.

BRIEF DESCRIPTION OF THE DRAWINGS

A comprehensive understanding of the invention will be obtained by considering the following several views of the drawings in conjunction with the detailed description, wherein.

DETAILED DESCRIPTION

Figure 1:
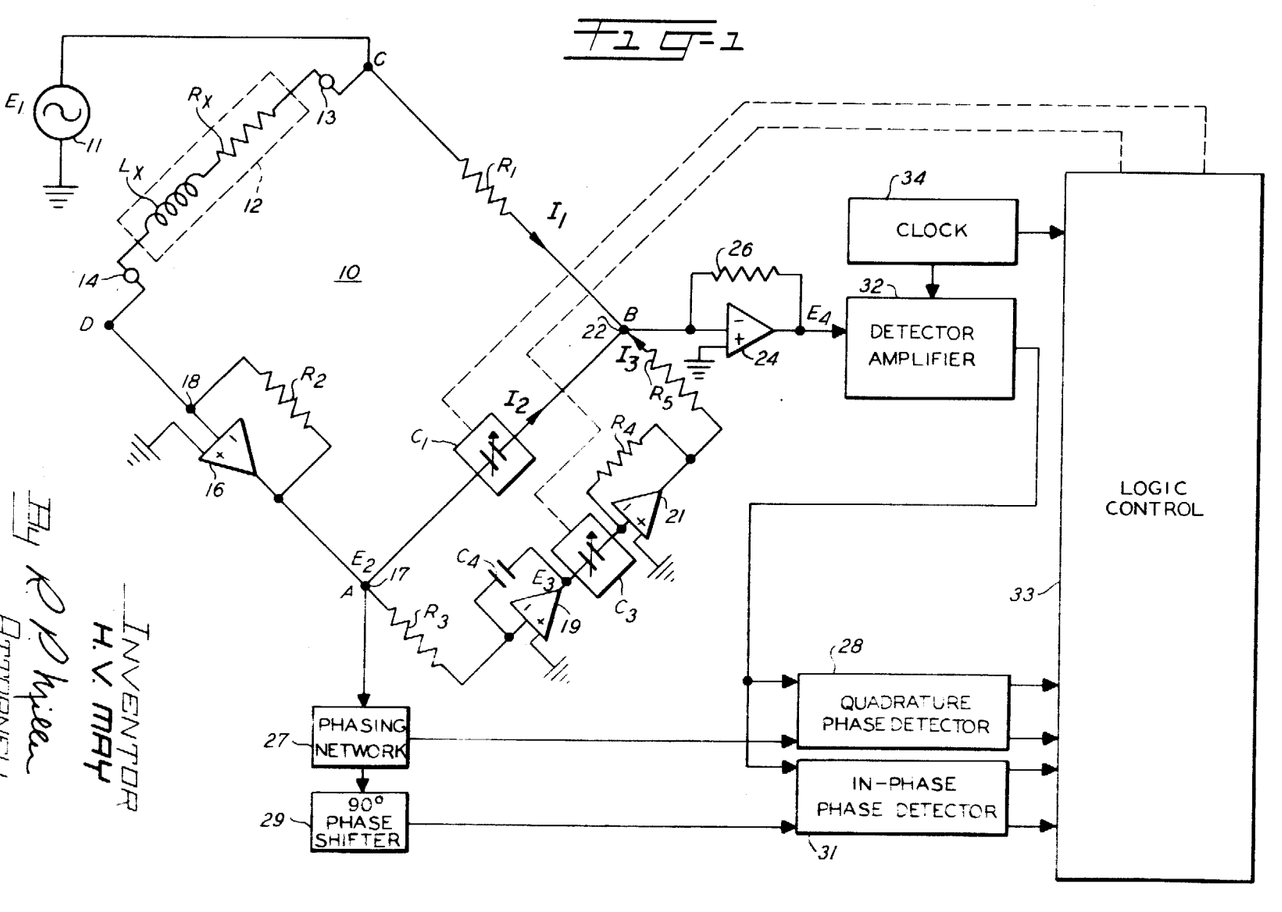
FIG. 1 is a partially detailed, schematic diagram of the automatic measuring system of the invention particularly illustrating a bridge circuit for measuring the series inductance and effective resistance of an inductor.

Referring to FIG. 1 there is shown an automatic system for measuring and indicating the inductance and effective resistance of an inductor. For greater clarity a circuit 10 has been schematically illustrated in the familiar diamond shape of an impedance bridge. In addition, the circuit 10 will be referred to as a "bridge" circuit, though it will be seen that the analogy between the circuit 10 and known impedance bridges breaks down in several important respects. By showing the bridge circuit 10 in the diamond shape of other impedance bridges the similarities as well as the departures from conventional impedance bridge operation will be more clearly understood.

THE BRIDGE CIRCUIT

The bridge circuit 10 has four arms AB, BC, CD, and AD. Connected within the arms AD and AB of the bridge circuit 10, as well as at its output, there are high-gain feedback amplifiers, such as Philbrick Model PP-45U Amplifiers manufactured by Philbrick Researches, Inc., and known in the art as operational amplifiers, gaining their name from their use in performing various operations upon signals applied to their inputs. An ideal operational amplifier possesses the following features: (1) infinite open-loop input impedance and gain; (2) zero-output impedance; and (3) infinite bandwidth. Such an ideal device would possess closed-loop performance which would depend entirely upon the feedback components connected thereto. In practice the operational amplifiers used in the present invention differ from ideal operational amplifiers by some small predictable variations resulting in slight errors which can be compensated for by various methods well known in the art as increased precision is required or desired.

A constant-frequency AC source 11 provides a test voltage $E_1$ for the bridge circuit 10. A test component 12 such as an inductor $Z_x$ represented by a series inductance $L_x$ and resistance $R_x$ is connected into the arm CD of the bridge circuit 10 between a pair of test terminals 13 and 14. The current through the test component 12 passes through an operational amplifier comprising a high-gain amplifier 16 and a feedback resistor $R_2$. The combination of amplifier 16 and feedback resistor $R_2$ provides current-to-voltage conversion, the output voltage $E_2$ thereof at terminal 17 (point A) being sufficient to produce enough current through feedback resistor $R_2$ to balance out the test current at a summing junction 18 (point D) to make junction 18 a virtual ground.

Part of the current provided by the source 11 passes through a resistor $R_1$ in arm BC of the bridge circuit 10. This current $I_1$ is equal in magnitude but 180° out of phase with the current in the arm AB of the bridge circuit 10 when the bridge is balanced.

The arm AB of the bridge contains the balancing standards for the bridge. The bridge standards are shown as two variable-capacitor decade boxes $C_1$ and $C_3$. In a conventional Maxwell bridge the two-terminal standards are a variable capacitor for the inductance standard connected in parallel with a variable resistor for the resistance standard. Though a similar arrangement could be used in the bridge circuit 10, it is desirable at some frequencies to use capacitors for both standards since discrete values of capacitance may be switched in parallel with a resulting higher degree of purity than resistors. To this end, some phase-shifting elements must be connected in series with capacitor $C_3$ to insure the proper phasing of the voltage across the arm AB. This voltage must be shifted in phase 90° lagging voltage $E_2$ to compensate for the phase shift across capacitor $C_3$. This phase shift can be accomplished by using a differentiator or, as here, an integrator in tandem with a current inverter.

The integrator comprises a high-gain amplifier 19 having a feedback capacitor $C_4$ and an input resistor $R_3$. The output $E_3$ of the integrator amplifier 19 leads voltage $E_2$ by 90°.

The current inverter comprises a high-gain amplifier 21 having a feedback resistor $R_4$. The current inverter senses and inverts the current through variable capacitor $C_3$ to provide the needed additional 180° phase shift.

The currents $I_2$ through variable capacitor $C_1$ and $I_3$ through a series resistor $R_5$ as well as the current $I_1$ through resistor $R_1$ are summed up at a terminal 22 (point B) of the bridge circuit 10, which is the current-summing input to an operational amplifier comprising a high-gain amplifier 24 having a feedback resistor 26. The output voltage $E_4$ of the amplifier 24 is the bridge-balancing signal. When the bridge is balanced $E_4$ is zero. This condition is satisfied when $I_1+I_2+I_3=0$ (i.e., when the current in arm AB is equal to the current in arm BC.)

The balance equations for the bridge circuit 10 are derived as follows:

At balance, $$I_1+I_2+I_3=0 \quad (1)$$

Since $$I_1=\frac{E_1}{R_1} \quad (2)$$

$$I_2=\frac{-jE_1R_2\omega C_1}{R_x+j\omega L_x} \quad (3)$$

and $$I_3=\frac{-E_1R_2R_4C_3}{R_5C_4R_3(R_x+j\omega L_x)}, \quad (4)$$

by substituting equations (2), (3), and (4) into equation (1) the real terms yield the value of effective resistance $$R_x=\frac{R_1R_2R_4C_3}{R_3R_5C_4} \quad (5)$$

and the imaginary terms yield the value of inductance $$L_x=R_1R_2C_1 \quad (6)$$

Equations (5) and (6) are the bridge balance equations. Fixed values may be used for $R_3$, $R_4$, $R_5$, and $C_4$, and, as an example, if $R_3=R_4=R_5=10000$ ohms and $C_4=0.01$ μf. equation (5) becomes $$R_x=10^6R_1R_2C_3 \quad (7)$$

It can be seen from equations (5) and (6) that the values of $R_3$, $R_4$, $R_5$, and $C_4$ may be varied to change the measuring range of effective resistance $R_x$ without changing the range of inductance $L_x$. It can also be seen that resistors $R_1$ and $R_2$ may be varied to change the range of both $R_x$ and $L_x$. If a variable resistance is used as the resistance standard equation (5) becomes $$R_x = R_1 R_2 G \qquad (8)$$

where $G$ is the conductance value of the variable resistor. If a variable resistor is used for the resistance standard, the amplifiers 19 and 21 and their associated components making up an integrator and an inverter will not be required.

As noted above the output voltage $E_4$ is the balancing voltage from the bridge. The voltage $E_4$, in conjunction with phase information derived from the bridge, drives the automatic balancing system for the bridge circuit 10.

The bridge circuit 10 is uniquely suited to a phase-sensitive detection scheme, having therein a phase reference voltage having the proper phase to determine which standard component if off balance and in which direction, up or down, the value of that standard must be varied to achieve balance. To this end the output of amplifier 16, the voltage $E_2$ at terminal 17, may be used as a reference voltage for a phase-sensitive detector. If $R_2$ is a fixed valued resistor, the voltage $E_2$ varies directly with the test current through the test component 12. The test current can therefore be determined by measuring $E_2$ and dividing the measured value of $E_2$ by $R_2$.

In general, the voltage $E_2$ is fed to a phasing network 27 which compensates for the overall phase shift in the balancing circuitry. The output of the phasing network 27 is fed to a quadrature phase detector 28 and also to a 90° phase-shifting network 29 where it is then fed to an in-phase phase detector 31. The bridge-balancing signal $E_4$ is amplified by a detector amplifier 32 and then fed to the phase detectors 28 and 31. In this manner, the reference voltage $E_2$ when combined with $E_4$ in the phase detectors 28 and 31 can be made to produce DC output voltages from the detectors which are indicative of the amounts which the values of the bridge standards must be increased or decreased in order to approach balance. The detector output voltages are fed to a logic control circuit 33 which converts the unbalance information into digital switching information, utilizing the latter to vary the bridge standards $C_1$ and $C_3$ until the bridge signal voltage $E_4$ is zero and the bridge is balanced.

The Automatic Balancing System

Figure 2:
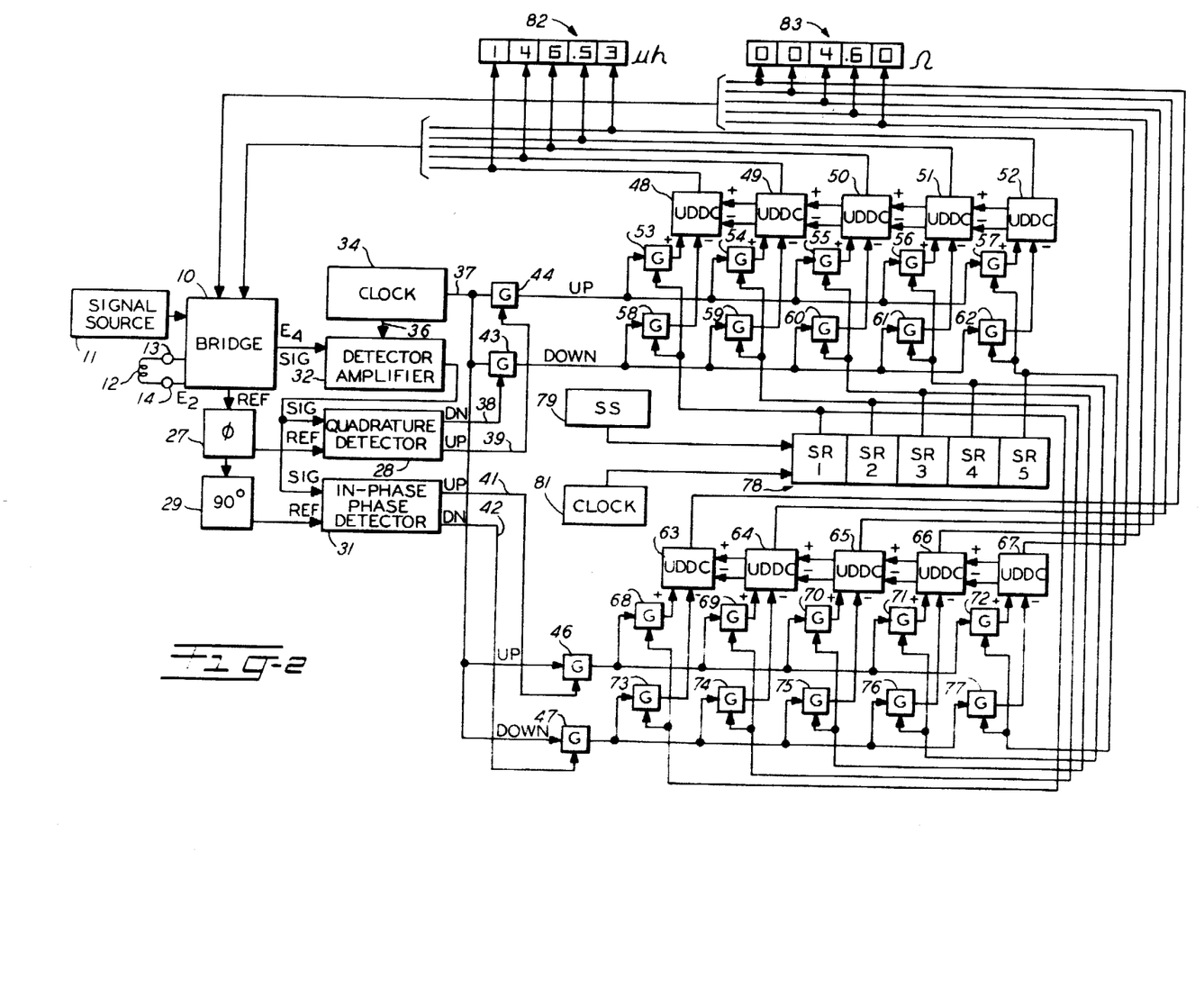
FIG. 2 is a detailed block schematic diagram of the automatic measuring system of FIG. 1 particularly illustrating a logic control circuit for varying banks of bridge standards in response to balancing information derived from the bridge circuit.

Referring to FIG. 2, the automatic balancing system for the bridge circuit 10 includes a clock pulse generator 34 having a pair of outputs 36 and 37. The clock 34 is a continuously running pulse oscillator which may have a frequency of approximately 100 p.p.s. The output 36 from the clock 34 operates a relay in the detector amplifier 32 which suppresses the output signal from amplifier 32 whenever a pulse appears on clock output 36.

The output from detector amplifier 32 delivers the amplified bridge signal voltage $E_4$ to both phase detectors 28 and 31, which each have a pair of DC outputs polarized according to the phase relationship between an AC input signal ($E_4$) and an AC reference signal ($E_2$). The phase detectors may be of a type such as a Princeton Model JB-6, two-phase lock-in amplifier, manufactured by Princeton Applied Research Corp. In the quadrature phase detector 28, if the signal voltage $E_4$ leads $E_2$ a DC output will appear on an output 39 (UP) of the quadrature phase detector. If the signal voltage $E_4$ lags $E_2$, a DC voltage will be present on an output 38 (DN) of phase detector 28. Similarly, the outputs 41 (UP) and 42 (DN) of the in-phase phase detector 31 represent the phase lead or lag, respectively, of signal voltage $E_4$ with respect to phase-shifted reference voltage $E_2$.

The D.C. outputs 38 and 39 of the quadrature phase detector 28 are connected to the enabling inputs of two logic gated 43 and 44, respectively. Gates 43 and 44 are the DOWN and UP gates for the inductance parameter of the unknown component 12. Similarly, the outputs 41 and 42 of the in-phase phase detector 31 also control two logic gates 46 and 47, respectively, which are the UP and DOWN gates for the resistance parameter of component 12. Thus an output from either or both detectors 28 and 31 will control an UP or DOWN gate associated with that output.

The output 37 of continuously running clock 34 is fed to the signal inputs of gates 43, 44, 46, and 47. The outputs of gates 44 and 43 are connected to the up (+) and down (−) inputs, respectively, of each of five up-down decade counters (UDDC) 48 to 52, associated with the inductance parameter $L_x$ of the component 12, through two sets of input gates 53 to 57 and 58 to 62. The outputs of gates 46 and 47 are connected to the up (+) and down (−) inputs, respectively, of up-down decade counters 63 to 67, associated with the resistance parameter $R_x$ of the component 12, through input gates 68 to 72 and 73 to 77, respectively.

Thus each decade counter has two input gates associated with it, one for receiving up (+) pulses and one for receiving down (−) pulses. Each decade counter is of a commercially available type, such as Beckman Model 6013 accumulators, manufactured by Beckman Instruments, Inc., capable of registering input pulses in steps up or down from zero to nine. Each counter has a binary-coded-decimal output indicative of the accumulated input pulses. The gates associated with the inputs of the decade counters are enabled by the output pulses from a five-stage shift register 78. The input gates pass input pulses into the decade counters only when the shift register stage controlling those gates is on. Each stage of the shift register 78 controls the inputs to two decade counters, one in the inductance bank and one in the resistance bank. For example, the input gates 53 and 58 for the major inductance decade counter 48 and the input gates 68 and 73 for the major resistance decade counter 63 are controlled by stage SR-1 of the shift register 78. Similarly, stage SR-2 of the shift register 78 controls the balancing pulses to the next major inductance and resistance decade, represented by counters 49 and 64, respectively. Only one stage of the shift register 78 is on at any given time; and, therefore, one inductance and one resistance decade will receive balancing pulses simultaneously.

The shift register is activated by a start pulse from a single-shot pulse generator 79 when the latter is triggered by connecting it to an energy source. The start pulse from single shot 79 turns on stage SR-1 of the shift register 78. Thereafter, the output of the shift register is shifted to successive stages to shift the balancing operation to next lower inductance and resistance decades in response to output shifting pulses from a clock pulse oscillator 81, which operates continuously at about 4 p.p.s., until all the decades are balanced. The test cycle is completed upon the shifting out of a pulse from stage SR-5 of the shift register 78.

Whenever the gates associated with one of the decade counters are enabled by an output from one of the stages of the shift register 78 and whenever a gate associated with the phase detector conditioning that counter is enabled by an output from that detector, the output pulses from the clock 34 will be fed to that decade counter to make it count either up or down.

Interconnections between the up-down decade counters associated with each parameter (inductance and resistance) to be measured slave all balanced decades to the decades being balanced. This is necessary because each of the decades is balanced to within one unit. Thus when any decade counter to the right of the two major decade counters 48 and 63 is counting and the count goes above nine (from nine to zero) the counter being balanced will feed an up (+) pulse to the counter immediately to its left. If the count on the decade counter associated with the decade being balanced should go below zero (zero to nine) it will deliver a down (−) pulse to the decade to its left.

The binary-coded-decimal outputs from each of the decade counters feed an associated capacitance decade in the bridge circuit to vary the value of the bridge standards to balance the bridge. The outputs of counters 48 to 52 feed five capacitance decades or banks of capacitor, which make up the variable capacitor $C_1$ in the bridge circuit 10 of the FIG. 1. Each of the counters 48 to 52 also feeds the drive for lamps in a digital indicator 82 which provides a direct visual readout of the inductance of the test component 12. Similarly, the counters 63 to 67 have their outputs connected to five capacitance decades which make up the variable capacitor $C_3$ of FIG. 1 and the drive for lamps in a digital indicator 83 which provides a direct visual readout of the effective resistance of the test component 12.

Figures 3, 4, 5:
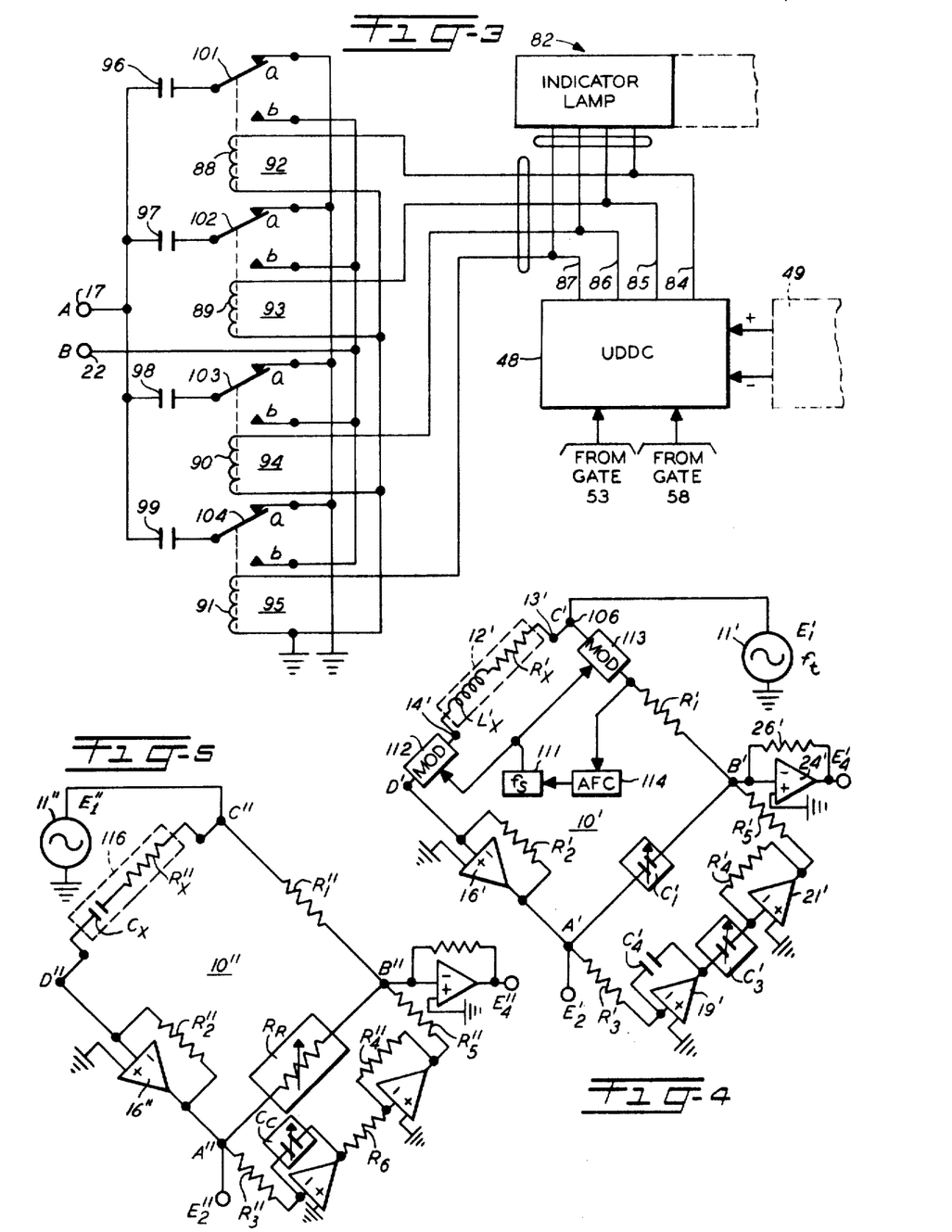
FIG. 3 is a detailed schematic diagram of a representative capacitance decade bank and its associated switching relays showing the arrangement by which the output of a decade counter permutes the relays to vary the value of the capacitance decade bank.
FIG. 4 is a schematic diagram of an alternative embodiment of the bridge circuit of FIG. 1 for operating the bridge standards at a fixed frequency.
FIG. 5 is a schematic diagram of a further alternative embodiment of the bridge circuit shown in FIG. 1 for measuring the series capacitance and effective resistance of a capacitor.

A greater understanding of the arrangement for varying the bridge standards may be had with reference to FIG. 3 wherein a typical single capacitance decade is shown. It will be understood that a similar arrangement exists for each counter of the system. The number of decades in the system depends upon the degree of accuracy desired and the limitations of the components of the system. All of the decades which go to make up the standard $C_1$ of FIG. 1 are connected in parallel between the bridge terminals 17 and 22 (arm AB). The decades representing $C_3$ are connected in a similar manner between the output of amplifier 19 and the input of amplifier 21.

The binary-coded-decimal output of each of the decade counters is fed to one of the decades of one of the bridge standards $C_1$ or $C_3$ and also to one of the drive lamps in indicator 82 (inductance) or 83 (resistance). As illustrated in FIG. 3, binary outputs appearing on lines 84 through 87 of the up-down decade counter 48 are respectively connected to the operating coils 88 through 91 of four relays 92 through 95, which may be W.E. type 303E mercury-wetted reed relays, manufactured by Western Electric Co., Inc., each having a set of transfer contacts $a$ and $b$.

The upper contacts 92a through 95a of the relays 92 through 95 connect the output of capacitors 96 through 99 to ground when the relays are not operated. Since the inputs to amplifiers 21 and 24 are virtual grounds, the loads on the outputs of amplifiers 16 and 19 are held constant.

The lower contacts 92b through 95b, respectively, of the relays 92 through 95 are directly connected to terminal 22 (point B) of the bridge circuit 10 of FIG. 1 and are normally connected to one side of the capacitors 96 through 99, respectively, through movable contacts 101 through 104. In the arrangement shown, all of the capacitors 96 through 99 are connected in parallel. Since parallel capacitors add directly to give total capacitance and since, from the bridge-balancing equations, $$L_x = R_1 R_2 C_1, \quad (6)$$

and the resistors $R_1$ and $R_2$ may have fixed values, the capacitors 96 through 99 may be chosen such that the parallel combination of capacitors will give the proper inductance value. For example, if $R_1=100$ ohms and $R_2=1,000$ ohms equation (6) becomes $L_x=10^5 C_1$ (9) in which case a reading on the first major decade of inductance indicator 82 of "1" would mean that for the inductance $L_x$ to equal 100 microhenrys the corresponding decade capacitance must equal 1,000 pf. If then the major capacitance decade contained capacitors 101, 96, 97, 98 and 99, having values of 1,000 pf., 2,000 pf., 2,000 pf., and 4,000 pf., respectively, the various combinations of these capacitors would yield inductance values of 0 to 900 microhenrys in increments of 100 microhenrys corresponding to values of 0 to 9 displayed on the indicator 82 and associated with the first major decade. Similarly, the second major capacitance decade would contain four capacitors having values of 100 pf., 200 pf., 200 pf., and 400 pf. to yield inductance values of 0 to 90 microhenrys in increments of 10 corresponding to values of 0 to 9 displayed on the indicator 82 and associated with the second major decade. The same is true of the third major decade and the two minor decades associated with the inductance value and all of the decades associated with the resistance value of the test component.

The major decades represent the positive powers of 10 of the value of the parameters to be measured while the minor decades represent the negative powers of 10 of the parameter values.

Thus each decimal digit of the values of both $L_x$ and $R_x$ requires a circuit similar to that illustrated in FIG. 3. The capacitors, which are permutatively switched by the binary-coded-decimal outputs of the decade counters, may be of the three terminal type in order to permit greater precision. The relays, as pointed out above, may be mercury-wetted reed relays which have an average life of more than one billion operations, several thousand times the life of the conventional rotary switches in use in most decade boxes. The switching time for reed relays is approximately 2 milliseconds, which is considerably faster than the switching time required for a rotary switch.

Operation

Referring to FIG. 2, an inductor 12, the inductance and resistance of which is to be measured, is connected to test terminals 13 and 14 of the bridge circuit 10. A constant-frequency AC signal is applied to the bridge circuit from signal source 11. The reference voltage $E_2$ is applied to the 90° phase-shift network 29 through the phasing network 27. The outputs of the phasing network 27 and the phase-shift network 29 are applied to the reference (REF) inputs of quadrature phase detector 28 and in-phase phase detector 31, respectively. The test voltage $E_4$ from the bridge circuit 10 is fed through the detector amplifier 32 controlled by clock 34 and the output of the detector amplifier 32 is fed to the signal (SIG) inputs of the quadrature and in-phase phase detectors 28 and 31.

The outputs 38 and 39 of the quadrature phase detectors 28 feed to the enabling inputs of DOWN and UP gates 43 and 44, respectively. The outputs of 41 and 42 of in-phase detector 31 are fed to UP and DOWN gates 46 and 47, respectively. If the signal voltage $E_4$ leads the reference voltage $E_2$ in the quadrature phase detector 28, there will be an output on line 39 of the phase detector 28 to the enabling input of UP gate 44. Similarly, if the signal voltage $E_4$ leads the phase-shift reference voltage $E_2$ in the in-phase phase detector 31, there will appear an output on line 41 of phase detector 31 which will be fed to the enabling input of UP gate 46. While there is an output signal from either of the detectors 28 and 31, the UP or DOWN gate associated with that detector will permit an output pulse on line 37 of the clock 34 to be fed to all of the inputs of the gates associated with the decade counters through the enabled UP and SOWN gates.

To start the measuring cycle the single-shot pulse generator 79 is triggered and the first stage SR-1 of the shift register 78 is turned on. Thereafter, continuously running clock 81 shifts the signal progressively from left to right to each stage of the shift register. When the pulse shifts out of the last stage SR-5 of the shift register 78, the balancing operation is ended.

As an example of the operation of the system consider that the value of the inductance $L_x$ of the component under test 12 is 146.53 microhenrys and the value of the resistance $R_x$ of the component under test 12 is 4.60 ohms. The component 12 is connected between test terminals 13 and 14 of the bridge circuit 10. The source 11 is turned on and voltage $E_2$ and $E_4$ are fed to phase detectors 28 and 31.

A signal will appear on line 39 of the quadrature phase detector 28, and line 41 of the in-phase phase detector 31 enabling gates 44 and 46, respectively. The single-shot pulse generator 79 is then triggered and the first stage SR-1 of the shift register 78 is turned on, thus enabling the input gates 53 and 58 to decade counter 48 and the input gates 68 and 73 to decade counter 63. Thus while stage SR-1 of the shift register 78 is turned on the decade counters 48 and 63 receive counting pulses from output 37 of the clock 34. If all the counters are initially set at zero, both counters 48 and 63 will count up one step upon receipt of the first pulse from clock 34. At this time the binary-coded-decimal outputs from counters 48 and 63 will cause the leftmost display position of both indicators 82 83 to display a "1." At the same time, as pointed out in the description associated with FIG. 3, the binary-coded-decimal outputs of counters 48 and 63 will actuate the relays associated with the major decades for inductance and resistance to switch-in a combination of capacitors indicative of the displayed and registered count. This will vary the value of standards $C_1$ and $C_3$ and thus have an effect on the outputs of phase detectors 28 and 31.

The output on line 39 of the quadrature phase detector will be reduced. The output on line 41 of the in-phase phase detector 31 will be zero and an output will now appear on line 42 of phase detector 31. Thus UP gate 46 will be closed and DOWN gate 47 will be opened to permit pulses from clock 34 to be fed to the down (−) input of decade counter 63.

If a pulse from the clock 81 has not shifted the shift register output from stage SR-1 to the second stage SR-2, a second pulse from the clock 34 will c?·se counter 48 to count up from 1 to 2 and will cause counter 63 to count down from 1 to 0. The output of quadrature phase detector 28 will shift from line 39 to line 38 to start the counter 48 counting down from 2 to 1 until the phase detector 28 again shifts outputs. Thus, as long as stage SR-1 of shift register 78 is turned on, counter 48 will count up and down between 1 and 2. Counter 63 will count up and down between 0 and 1 in the same manner due to the shifting outputs of in-phase phase detector 31.

When a pulse from clock 81 shifts the output of shift register 78 to stage SR-2, the next lower decades for both inductance and resistance will be balanced in response to pulses from clock 34 to decade counters 49 and 64. If counter 48 is registering a 2, counter 49 will count down from 0 to 9. Since counter 48 is slaved to counter 49, a down (−) pulse will be delivered from counter 49 to counter 48 when zero is crossed by counter 49 and counter 48 will then register a 1. Counter 49 will continue to count down until it registers a 4. The quadrature phase detector 28 will then shift its output to line 39 and counter 49 will count up to 5. The counter 49 will continue to count between 4 and 5 until the third stage SR-3 of the shift register 78 is turned on.

If, at the time the output of shift register 78 shifted to the second stage SR-2, the counter 48 had been registering a 1 counter 49 would have started counting up from 0 to 5. The quadrature phase detector 28 would then have shifted outputs and the counter 49 would then have counted down to 4. At this time, the quadrature phase detector 28 output would shift from line 38 to line 39 to deliver up (+) pulses to counter 49. Thus in either case the registered count on counter 48 at the time the shift register shifts does not affect the count on counter 49 which continues counting up and down between 4 and 5.

Simultaneously, with the second stage of the shift register 78 turned on, if a 1 is registered on counter 63 the counter 64 will count down from 0 passing a down (−) pulse to counter 63 which will then count down from 1 to 0. Counter 64 will continue to count down until it reaches 0. At this time the output of in-phase phase detector 31 will shift from line 42 to line 41 and counter 64 will count up to 1. The counter 64 will continue to count up and down, between 0 and 1, until the third stage SR-3 of shift register 78 is turned on.

The same result would be obtained if, at the time of shifting of the shift register 78, the counter 63 registered a 0. In that case the counter 64 would begin initially to count up. After the count on counter 64 had gone from 0 to 1 the output of in-phase phase detector 31 would then shift to reverse the direction of the count and counter 64 would count down from 1 to 0. The counter 64 would thereafter continue to count up and down between 0 and 1 until the next shift pulse was delivered by clock 81.

When stage SR-3 of shift register 78 is turned on, if counter 49 is registering a 5, down (−) pulses will be received by counter 50 and counter 50 will count down from zero, passing a down (−) pulse to counter 49 which will then register a 4. Counter 50 will continue to count down until the registered count reaches 6 at which time the output of phase detector 28 will shift and up (+) pulses will be delivered to counter 50 which will then count up from 6 to 7. At that time the output of phase detector 28 shifts again and counter 50 reverses its count, counting down. As long as stage SR-3 of the shift register 78 is turned on counter 50 will count up and down between 6 and 7.

Simultaneously, when stage SR-3 of the shift register 78 is turned on, if counter 64 is registering a 1, the counter 65 will count down from 0, delivering a down (−) pulse to counter 64 which then counts from 1 to 0. The counter 65 will continue to count down until it registers 4. At this time the output of in-phase phase detector 31 will shift from line 42 to line 41 and counter 65 will count up to 5. Counter 65 will continue to count up and down between 4 and 5 until the fourth stage SR-4 of the shift register 78 is turned on.

When a pulse from clock 81 shifts the output of shift register 78 from stage SR-3 to stage SR-4 the input gates 56 and 61 to counter 51 and input gates 71 and 76 to counter 66 are enabled. If, at this time counter 50 registers 7, counter 51 will be receiving down (−) pulses from clock 34 and will count down from 0, delivering a down pulse to counter 50 which will then count down from 7 to 6. Counter 51 will continue to count down until it again reaches 5. At this time the output of quadrature phase detector 28 will shift to permit up (+) pulses from clock 34 to be delivered to counter 51. Counter 51 will reverse its count, counting up from 5 to 6. When counter 51 registers, a 6 the quadrature phase detector 28 output again shifts. Counter 51 will cont... thereafter to count up and down between 5 and 6 until the output of shift register 78 shifts from stage SR-4 to the fifth stage SR-5.

If counter 65 is registering a 5 at the time of the shift from stage SR-3 to stage SR-4 of the shift register 78, counter 66 will receive down (−) pulses from click 34, counting down from 0 through 9, and delivering a down (−) pulse to counter 65 which will then count down from 5 to 4. Counter 66 will continue to count down until it reaches 5, at which time the output of the in-phase phase detector 31 shifts to reverse the count. Counter 66 will reverse counting going up from 5 to 7 when the output of in-phase phase detector 31 again shifts. The counter 66 thereafter continues counting between 5 and 7 until the fourth stage of the shift register 78 is turned off by a shift pulse from clock 81.

It will again be appreciated that both counters 51 and 66 would behave in the same manner ad described above if the counts registered in counters 50 and 65 had been 6 and 4, respectively. The only difference in operation would be that both counter 51 and counter 66 would have initially started counting up, passing from 9 to 0 and delivering an up (+) pulse to counters 50 and 65, respectively. Thus if the period of operation of each stage of shift register 78 is much longer (at least 20 times) than the period of operation of the clock 34 the resulting counter operation associated with each stage is the same. Excellent results have been obtained with clock 34 operating at 100 p.p.s. and clock 81 operating at 4 p.p.s.

When the next shift signal from clock 81 turns on the fifth and final stage SR-5 of the shift register 78, the input gates 57 and 62 to counter 52 and input gates 72 to 77 to counter 67 are enabled.

If counter 51 at this time registers a 5, pulses from clock 34 will pass through gates 44 and 57 to start counter 52 counting up from 0 to 3 at which time the output of the quadrature phase detector 28 is 0. The counter 52 will then stop.

The registered counts on up-down decade counters 48, 49, 50, 51, and 52 are 1, 4, 6, 5, and 3, respectively, indicating an inductance of 146.43 microhenrys which can be read directly from the visual display indicator 82.

If, at the time the last stage SR-5 of shift register 78 is turned on, the counter 66 is registering a 5, pulses from clock 34 will pass through gates 46 and 72 and counter 67 will begin counting up from 0 through 9 to 0, stopping at 0 since the output of in-phase phase detector 31 will at that time be zero. At this time an up (+) pulse will pass from counter 67 to counter 66 and counter 66 will count up once from 5 to 6.

The registered count for counters 63, 64, 65, 66, and 67 will be 0, 0, 4, 6, and 0, respectively, indicating an effective resistance of 4.60 ohms which can be read directly from display indicator 83.

It is not necessary to reset the counters before starting a new measuring cycle. To start a measuring cycle, it is necessary only to trigger the single-shot pulser 79. The total balancing time for the system described is less than 2 seconds, but refinements may be added to speed up the balancing time as desired.

All of the decade counters are controlled to prevent the readouts on the display indicators from going below zero. When all the decades preceding the decade being balanced are each registering and displaying zero, the decade counter associated with the decade being balanced will count down to zero and thereafter will disregard further down (−) pulses. As an example, suppose a new inductor having an inductance of 005.00 microhenrys is connected to test terminals 13 and 14 of the bridge circuit 10. The indicator 82 is displaying 146.53 microhenrys and the counters 48, 49, 50, 51 and 52 are registering 1, 4, 6, 5, and 3, respectively. When the single-shot pulser 79 is triggered, the measuring cycle will begin. The major decade counter 48 will run down to zero ans stop. When the shift register 78 shifts to balance the next decade, the counter 49 will also run down to zero and stop. The remaining decade counters will operate in the normal manner previously described.

It can readily be seen that the system of FIG. 3 readily lends itself to an automatic in-line testing system wherein a plurality of components can be successively presented to test terminals 13 and 14 to be measured and have their values displayed. The displayed values can be recorded along with identifying data for the components. For example, a plurality of inductors on an automatic conveyor can be serially fed or indexed to a test position wherein a pair of test terminals such as terminals 13 and 14 of the bridge circuit can be set up to contact the inductors as they are fed through the test position. A switch or other detecting device at the test position may be actuated automatically to trigger the single-shot pulser 79 to start the measuring cycle. The parameter values can be recorded or stored in a memory device for later access along with serial numbers on the inductors which may read from each inductor under test by an optical reader or the like, the output of which can be recorded along with the parameter values.

Alternative Embodiments

In many situations, it is desirable to measure the series inductance and resistance of an inductor under test at a high frequency or at a different frequency. Normally, the standards used in impedance bridges must be calibrated at these frequencies and corrections must be applied to the direct readings before accurate results can be obtained. As the test frequency is raised the corrections become more significant.

Referring to FIG. 4, there is shown an alternative embodiment of the impedance bridge of the present invention featuring an arrangement wherein the bridge standards can be operated at an intermediate frequency while the component under test is subjected to a test current at some higher frequency. The reference numerals used in FIG. 4 are the same as those used for the bridge circuit 10 of FIG. 1 with primes (') suffixing the numerals.

A modified bridge circuit 10' has connected to its test terminals 13' and 14' an inductor under test 12' represented as a series inductance $L_x'$ and $xR_x'$. A test AC voltage source 11' having a frequency $f_t$ is connected to the bridge between a terminal 106 and ground. A second AC voltage source 111 having a frequency $f_s$ is connected to two modulators 112 and 113 in arm C'D' and B'C', respectively. The output of modulator 113 is connected into an automatic frequency control 114 to keep the frequency $f_s$ of the second voltage source 111 at a constant frequency difference from $f_t$. The modulators 112 and 113 act to heterodyne the frequencies $f_t$ and $f_s$ to produce at the modulator outputs an intermediate frequency $f_{IF}$ where $$f_{IF} = f_t - f_s \qquad (10)$$

Thus the frequency $f_s$ of the second signal source 111 can be selected to produce a particular intermediate frequency $f_{IF}$ to operate the rest of the bridge circuit 10'. It can be seen that the component 12' is being tested at one frequency $f_t$ while the bridge standards $C_1'$ and $C_3'$ are operated at an intermediate frequency $f_{IF}$.

Modulator 112 has a very low input impedance and converts input current into an output current at the intermediate frequency $f_{IF}$.

Both modulators 112 and 113 are nonlinear devices having outputs containing various frequency components including the sum and difference of the input frequencies and harmonics thereof. The modulators 112 and 113 should be designed to selectively reject all of the output components except the one associated with the difference frequency which is represented by the phase relationship $$\theta_{IF} = \theta_t - \theta_s, \qquad (11)$$

where $\Theta_{IF}$ is the phase of the intermediate frequency, $\Theta_t$ is the phase of the higher frequency input and $\Theta_s$ is the phase of the lower frequency input. As seen from equation (11) the phase of each modulator output varies directly with the higher frequency input. It is for this reason that the higher frequency input $f_t$ is utilized to provide the test signal.

The conversion current gain of modulator 112 and the conversion voltage gain of modulator 113 can each be adjusted to unity. It is apparent that the test current will be different from the test current in the absence of modulators 112 and 113. Assuming that in FIG. 4 the inductance and resistance of the unknown and the test voltage are all constant and equal to those defined in FIG. 1, the test current is inversely related to the impedance of the unknown component 12', and a conversion factor $K$ can be defined such that $$K(R_x + j\omega_t L_x) = R_x + j\omega_{IF} L_x \qquad (12)$$

Solving equation (12) for reals, $$K = \frac{R_x}{R_x} = 1 \qquad (13)$$

and solving for imaginaries, $$K = \frac{j\omega_{IF} L_x}{j\omega_t L_x} = \frac{f_{IF}}{f_t} \qquad (14)$$

Thus with the modulator gains adjusted to unity the balance equations for the circuit of FIG. 4 become $$R_x' = \frac{R_1' R_2' R_4' C_3'}{R_3' R_5' C_4'} \qquad (5')$$

and $$L_x' = \left(\frac{f_{IF}}{f_t}\right)(R_1' R_2' C_1') \qquad (6')$$

The foregoing equations indicate that the resistance readout will be direct at all test frequencies while the inductance readout must be multiplied by the ratio of the intermediate frequency $f_{IF}$ to the test frequency $f_t$. This conversion can be accomplished by several devices well known in the art including a frequency ratio counter which could be connected to measure the ratio of $f_{IF}$ to $f_t$. The reading of the frequency ratio counter could be fed, along with the binary-coded-decimal outputs, of the five decade counters 48 to 52 of FIG. 2, into a computer which could automatically calculate the value of inductance of the test component.

Another embodiment of the bridge circuit of the invention is shown in FIG. 5 where the bridge circuit 10 of FIG. 1 has been modified to permit the measurement of the effective series capacitance and resistance of a capacitor under test. The elements of FIG. 5 have been given numerals corresponding to the reference numerals of corresponding elements of FIG. 1 followed by a double prime ("). Thus in FIG. 5 there is shown a bridge circuit 10" having a capacitor under test 116 represented as a series capacitance $C_X$ and resistance $R_x''$. The standards are connected in the arm A"B"of the bridge circuit 10". The resistance balancing standard is a bank of resistance decades represented by a variable resistor $R_R$. The capacitance-balancing standard is a bank of capacitance decades, each similar to the one shown in FIG. 3 and represented by a variable capacitor $C_C$. The balance equations for the bridge circuit 10" of FIG. 5 are derived in the same manner as those of the bridge circuit 10 of FIG. 1 and can be shown to be $$C_x = \frac{R_2'' R_5'' R_6}{R_4''} \frac{C_o}{R_1'' R_3''} \quad (14)$$

and $$R_x'' = \frac{R_1'' R_2''}{R_R} \quad (15)$$

It will be appreciated that the modification of FIG. 4 can be used with FIG. 5 for operating the standards $R_R$ and $C_c$ at an intermediate frequency while the component under test is operated at some higher test frequency.

The automatic balancing system for all embodiments of the invention is essentially the same and all embodiments thus operate according to the description associated with and set forth in connection with the circuits of FIGS. 1, 2, and 3.

What I claim is:

1. In an AC impedance bridge for measuring the two elemental parameters of an unknown impedance,
    a first bridge arm for receiving the unknown impedance,
    a second bridge arm connected to said first bridge arm and having a fixed resistance,
    a third bridge arm connected to said second bridge arm and having a first standard for balancing out one of the elemental parameters of the unknown impedance and a second variable standard for balancing out the second elemental parameter of the unknown impedance,
    a fourth bridge arm connected between said first bridge arm and said third bridge arm and having an operational-type current-to-voltage converter having a first input in series with the unknown and a second input at a fixed reference potential for producing a reference voltage output indicative of the current through the unknown,
    means for connecting a source of AC between the junction of said first and second arms and a point at said fixed reference potential,
    an operational amplifier connected to the junction between said second and third arms for producing an output voltage indicative of the current summed at the junction of said second and third arms, and
    balancing means responsive to the outputs of said operational amplifier and said current-to-voltage converter for varying the values of the first and second variable balancing standards to balance out the elemental parameters of the unknown impedance when said output voltage is zero.

2. In an AC impedance bridge as recited in claim 1, wherein: AC
    the unknown impedance is an inductor having elemental parameters of inductance and resistance;
    the first variable balancing standard is a variable capacitor connected between said second and fourth arms; and
    the second variable balancing standard is a variable capacitor and including phase-shifting means for connecting said second variable capacitor across said first variable capacitor.

3. In an AC impedance bridge as recited in claim 2, wherein:
    said phase-shifting means includes an integrator and a current inverter connected on opposite sides of said second variable capacitor.

4. In an AC impedance bridge as recited in claim 1 wherein said first and second variable standard value-varying means comprises:
    a first phase detector having a signal input and a reference input and having a DC output indicative of the phase relationship between the signal and reference inputs;
    a second phase detector having a signal input and a reference input and having a DC output indicative of the phase relationship between the signal and reference inputs;
    means for connecting the output voltage of said operational amplifier to the signal inputs of both said first phase detector and said second phase detector;
    means for connecting the reference voltage output of said current-to-voltage converter to the reference input of said first phase detector;
    means for imparting no more than a 90° phase shift to the reference voltage;
    means for connecting the phase-shifted reference voltage to the reference input of said second phase detector; and
    means responsive to the outputs of said first and second phase detectors for adjusting the values of said first and second variable standard elements until the output voltage of said operational amplifier is zero.

5. In an AC impedance bridge as recited in claim 1, wherein:
    the unknown impedance is a capacitor having elemental parameters of capacitance and resistance;
    the first variable balancing standard is a variable resistor connected between said second and fourth arms;
    the second variable balancing standard is a variable capacitor and including means for connecting said variable capacitor as the feedback element of an integrator connected in series with a current inverter across said variable resistor.

6. In a system for ascertaining the series inductance and effective resistance values of an unknown inductor,
    a closed four-arm bridge circuit having the inductor connected in a first arm and a pair of parallel selectable banks of capacitors connected in a second opposing arm,
    means for applying an AC current through the inductor,
    a third arm connected between a first end of the first arm and a first end of the second arm,
    means connected in said third arm for presenting a virtual ground to one side of said inductor and responsive to the current flow through the inductor for generating a first reference voltage proportional to the current through said inductor,
    means responsive to said first reference voltage for imparting a 90° phase shift to generate a second reference voltage,
    a fourth arm connected between said first and second arms and having a fixed resistance,
    means responsive to the currents summed at the juncture of the fourth arm and the second arm for generating a signal voltage indicative of the unbalance condition of said bridge,
    means responsive to the phase difference between said first reference voltage and the signal voltage for selectively connecting predetermined ones of a first of said banks of capacitors to balance the inductive effect of the inductor, and
    means responsive to the phase difference between the second reference voltage and the signal voltage for selectively connecting predetermined ones of the second of said banks of capacitors to balance the resistive effect of the inductor.